Dec. 13, 1927
H. J. WHEELER ET AL
1,652,968
OIL PUMPING APPARATUS
Filed April 17, 1926
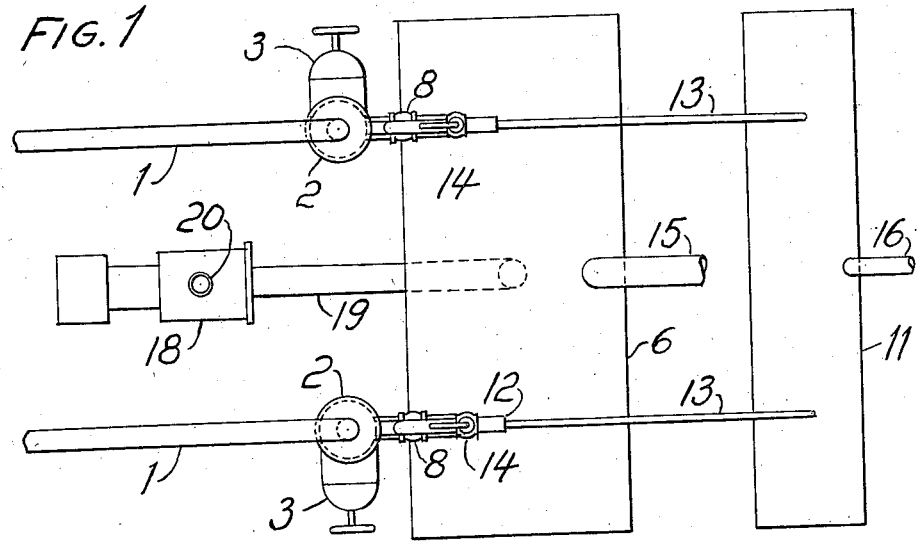
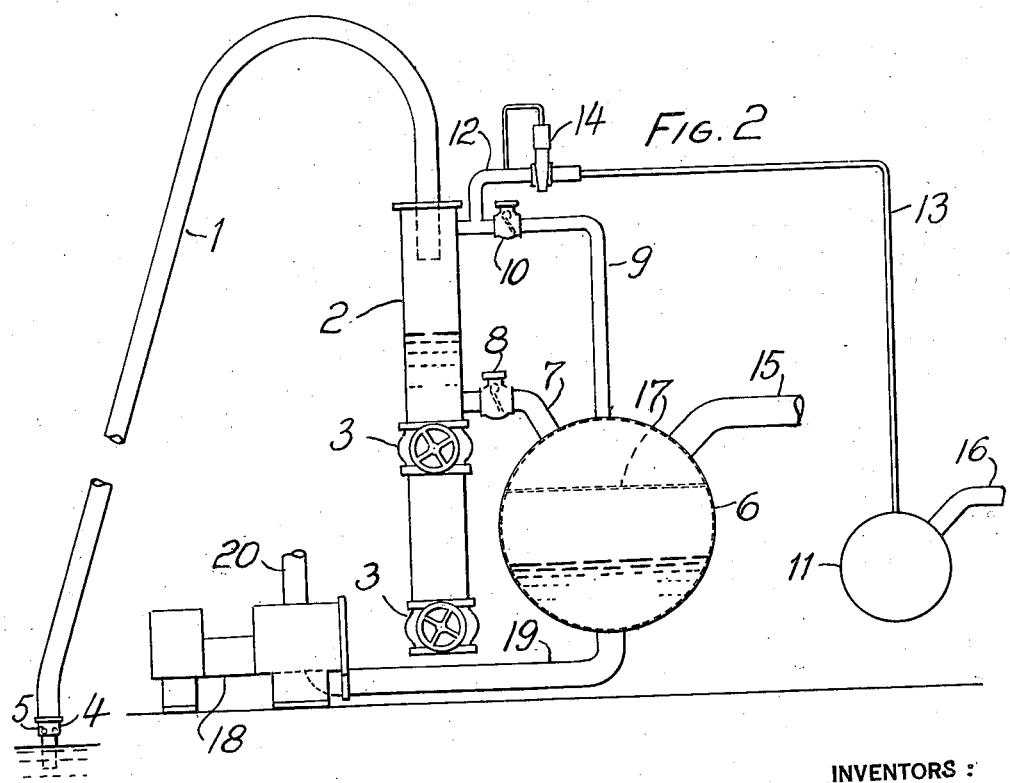
INVENTORS:

Patented Dec. 13, 1927.

1,652,968

UNITED STATES PATENT OFFICE.

HERVEY J. WHEELER AND GUNNAR C. ENGSTRAND, OF BROOKLYN, NEW YORK, ASSIGNORS TO SALVAGE PROCESS CORPORATION, OF NEW YORK, N. Y., A CORPORATION OF NEW YORK.

OIL-PUMPING APPARATUS.

Application filed April 17, 1926. Serial No. 102,690.

Our invention has for its object to furnish an apparatus adapted to pump viscous material in quantities without interruption of service.

It has for its object to provide a multiple of air lifts all emptying out in a common suction tank, from which tank the viscous material is preferably pumped by a transfer pump.

It has also for its object to provide means for screening and separating foreign bodies from the material pumped.

Our invention has for a further object to provide separate means for each air lift whereby a high vacuum is automatically applied to any of the air lifts when required without interfering with the existing vacuum in the remaining ones.

In the drawing:—

Figure 1 shows a plan view of the pumping apparatus.

Figure 2 is an end elevation of the same.

Referring to the drawing in which like reference characters designate corresponding parts, 1 represents the air lifts which terminate in the cylindrical stand pipes 2 which are supplied with gate valves 3.

At the intake end of the air lifts 1 a reducing nozzle 4 with a plurality of air inlet holes 5 is provided.

The stand pipes 2 are connected with the suction tank 6 by means of pipe lines 7 which are provided with a nonreturn valve 8.

From the top of stand pipes 2 the equalizing line 9 runs to the tank 6 and said line is also provided with a nonreturn valve 10.

The equalizing line 9 is also connected to the high pressure tank 11 by means of pipe 12 and the reduced pipe line 13.

The pipe 12 is provided with a pressure regulating valve 14 which opens when the pressure in stand pipe 2 equals the pressure in tank 6.

The air is exhausted from the tanks 6 and 11 by vacuum lines 15 and 16 respectively.

In the tank 6 is a longitudinal screen 17 provided.

The bottom of the tank 6 is connected to transfer pump 18 which is provided with suction line 19 and discharge line 20.

The operation is as follows:

A vacuum is maintained in tank 6 by means of vacuum line 15 and a high vacuum is maintained in tank 11 by the vacuum line 16.

The reducing nozzles 4 are now inserted in the material to be pumped and care is taken that the air holes 5 are exposed to the atmosphere.

The material is sucked up into the hose whereupon it is blown into a spray by the high velocity air inrush through the air inlets 5.

However a point is soon reached where the sucked up spray will interfere with the air current in the air lift lines 1, whereupon the sucked up viscous material will adhere to the inside of the air lift lines and in accumulating the viscous material will soon entirely clog the line.

It is to be noted that the vacuum in the stand pipes 2 is lower than the vacuum in tank 6 as long as air is free to flow through the air lift lines 1.

But when a line is clogged the vacuum in corresponding stand pipe becomes immediately the same as that in tank 6.

When this point is reached the regulating valve 14 is opened whereupon the vacuum in the stand pipe as well as in the corresponding air lift line is rapidly increased thus causing the clogging material slug to travel through the line at a great velocity.

When the clogging slug emits from the line into the stand pipe the vacuum is suddenly broken in the stand pipe and valve 14 is automatically closed.

It is to be noted that the high suction line 13 and the air holes 5 have to be so proportioned that an immediate vacuum break is assured.

The vacuum line 9 has also to be so proportioned that the vacuum in stand pipes 2 is lower than that in tank 6 when air is free to rush through the air lift line 1.

When sufficient material has accumulated in stand pipes 2 it will flow by gravity into tank 6 and will drop through the screen 17 to the bottom of the tank from where it is pumped out by the transfer pump 18.

The gate valves 3 are provided so that heavy material like scale and rivets can be withdrawn from the system without interference with the operation of pumping.

The check valves 10 and 8 are provided so that the momentarily high vacuum in the stand pipe will not be destroyed by a back rush from tank 6.

It is to be noted that the transfer pump has only to suck from a low vacuum which is an important feature where viscous material is concerned.

We also call to attention that the flow through pipes 9 and 13 also can readily be adjusted by the insertion of valves in said lines.

We do not wish to be understood as limiting ourselves to the specific details of construction as it is manifest that variations and modifications may be made in the adaptation of the device to various conditions without departing from the spirit and scope of our invention.

We claim:

In a pumping apparatus a suction tank, an air lift discharging in said suction tank and means for creating an intermittent vacuum in the air lift higher than that in the suction tank.

Signed at New York, in the county and State of New York, this 12th day of April, 1926.

HERVEY J. WHEELER.
GUNNAR C. ENGSTRAND.